Sept. 17, 1935.  W. H. FOSTER  2,014,431
SEWAGE FILTERING APPARATUS
Filed Oct. 8, 1932  2 Sheets-Sheet 1
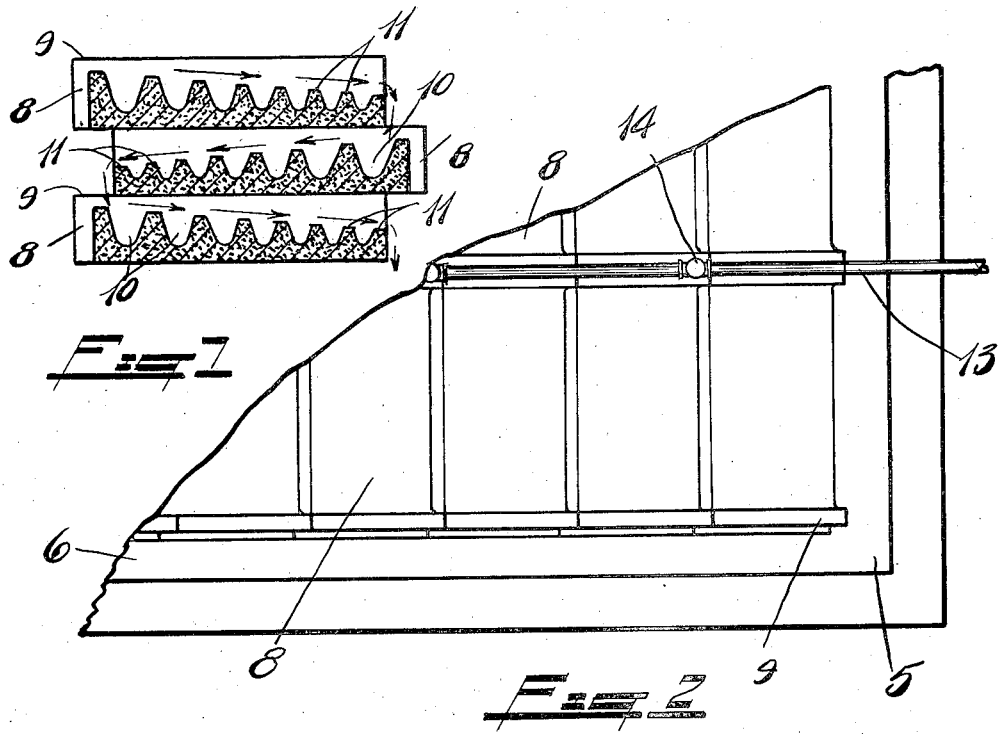
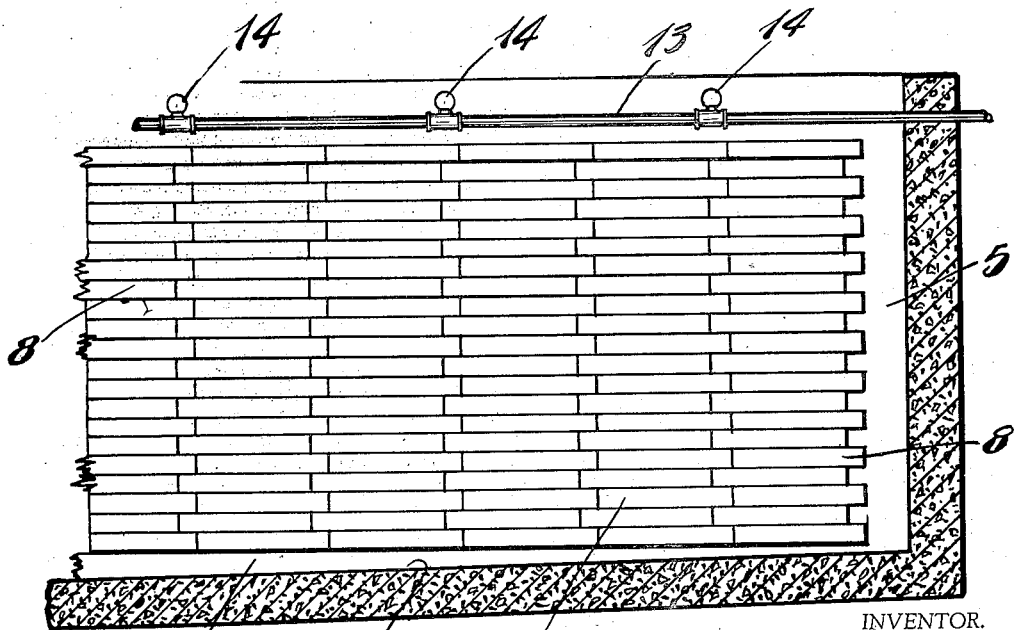
INVENTOR.
Wade H. Foster.
BY Frank C. Karman.
ATTORNEY.

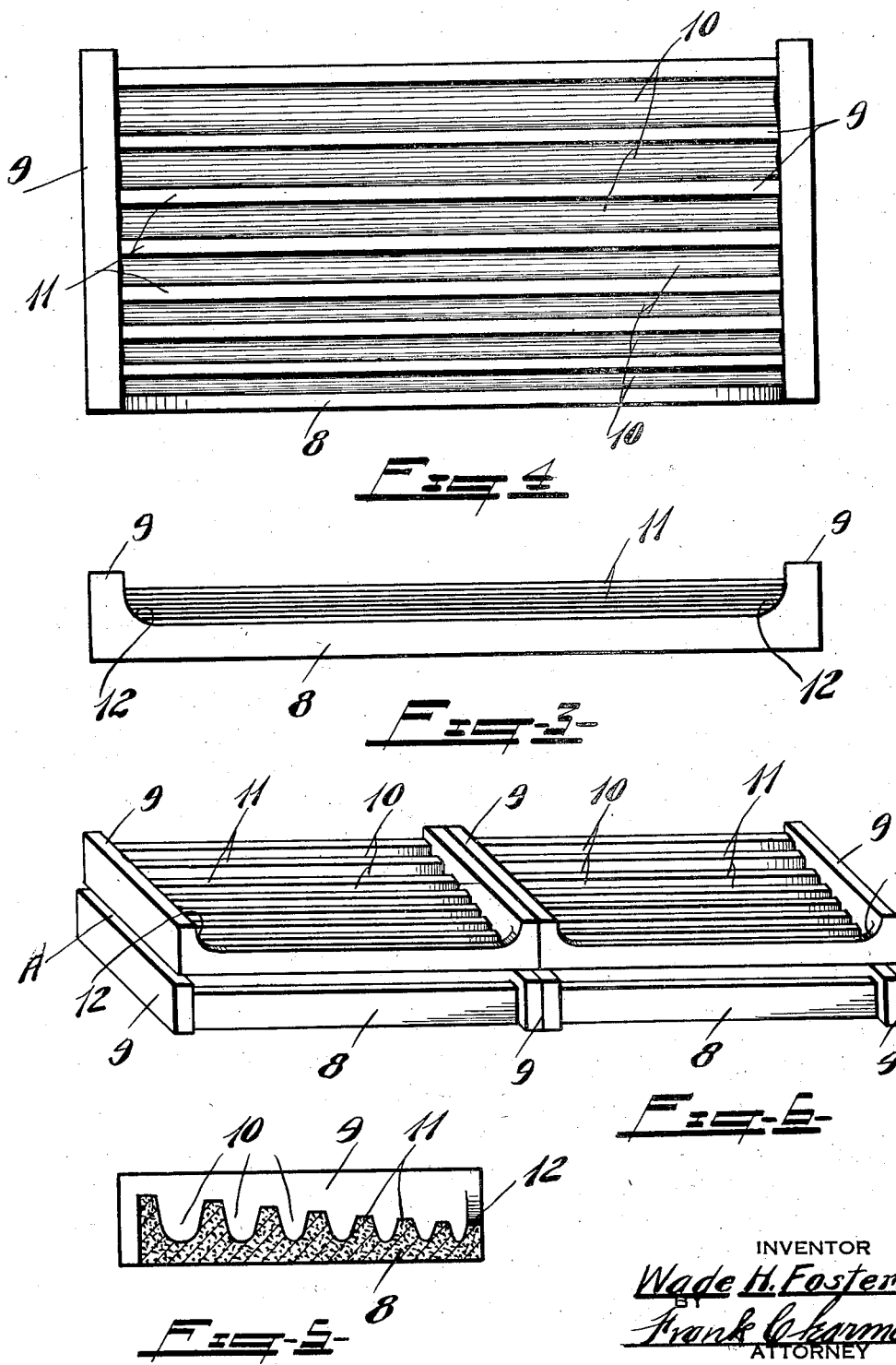

Patented Sept. 17, 1935

2,014,431

UNITED STATES PATENT OFFICE 2,014,431

SEWAGE FILTERING APPARATUS

Wade H. Foster, Bad Axe, Mich.

Application October 8, 1932, Serial No. 636,857

7 Claims. (Cl. 210—7)

This invention relates to filters, and more specifically to a polluted liquid filter for the intermittent or batch reception and purification of polluted liquids from cities and communities, and which is delivered by sewers and other conduits.

One of the prime objects of the invention is to design a filter of large capacity which cannot be clogged, which requires a minimum space or area, and which can be readily cleaned or washed by slushing water over the face thereof.

Another object is to design a precast porous filter formed of interlocking units in which both aerobic and anaerobic germ life rapidly and freely germinates, said units being designed and spaced to permit free air circulation through the filter, and which is provided with longitudinally disposed corrugated and pitched floors to cause a known direction of flow, the ridges between the corrugations forming a base on which fungi can form, causing detention and building up of sponge which adheres to ridges, causing prolonged detention of the liquid, retaining germ life and fine particles until such times as oxidization relieves its hold.

A further object is to provide a polluted liquid filter, the individual slabs of which are porous, allowing some liquid to seep through, and as the pores become clogged the excess liquid overflows after having seeped through sponges which have formed on the ridges, which retains the fine particles and germ life as herein described. The overflowing liquid drops on the next lowest slab where it either seeps through or overflows; clogged slabs then become unclogged by germ action, so that the filtering operation may be continuously carried on.

A still further object is to design a filter which can be of any desired area or capacity, and which can be restricted or enlarged by merely taking from or adding to, without in any manner hindering or interfering with the operation thereof.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 1 is a transverse sectional view of my sewage filtering apparatus.

Fig. 2 is a top plan view.

Fig. 3 is an enlarged front view of one of the precast slabs or sections.

Fig. 4 is a top plan view.

Fig. 5 is an enlarged transverse sectional view of one of the slabs.

Fig. 6 is an isometric view illustrating the interlocking of the slabs.

Fig. 7 is a transverse sectional view, the arrows illustrating the flow.

Heretofore it has been general practice to form filter beds of stone, sand, cinders, or other materials of a fragmentary, granular classification. Such beds, however, have numerous drawbacks and disadvantages, as they require a large area, and if the filtering material is too fine it will clog, or if the material is too coarse, the waste will seep through too rapidly without being properly filtered or oxidized, and all stone beds lack the proper capillary attraction to hold the waste in contact with the germ life for a sufficient length of time to permit full and free action.

Where the filter beds are made of sand, the upper strata quickly clogs, destroying the capacity, and, naturally, the efficiency of the bed, as the sewage cannot then be properly filtered.

The herein mentioned disadvantages I have overcome by providing a porous slab system, which cannot clog because of the clearances, and crowding or overloading the filter merely results in wastes passing over the slabs without being properly filtered, and while I have made specific reference to a porous slab system, it will be clearly understood that I do not so limit the invention, as I have found that under certain conditions solid slabs are very satisfactory.

Referring now to the accompanying drawings, the numeral 5 indicates a tank or structure in which the filter is mounted. This is provided with a pitched floor 6, so that the filtered liquid may be readily drained. Spaced apart supports 7 are placed on the floor as shown, and the filter slabs 8 are mounted thereon in superimposed relation, the number of slabs used being determined by the volume of sewage to be handed, also the degree of oxidization required.

The slab 8 is preferably precast and is formed of concrete, the mix being such that the slab will be of a porous nature when cured and ready for use; this can be of any desired size and is cast with raised end walls 9, the face being provided with a plurality of corrugations, grooves, indentations, or depressed areas, so that liquid to be treated collects therein, and in the present instance I have shown the face cast with a plurality of spaced apart longitudinally disposed grooves 10, the ribs or walls 11 which separate these grooves being of progressively varying heights, and upon which fungi can form, causing sponge to retain germ life and fine particles, the ends of the low end wall being curved upwardly and forming a fillet 12, and for a purpose to be presently described.

Under normal conditions these grooves retain quantities of the sewage water at all times, providing a home for free swimming forms of germ life, and when the untreated sewage is sprayed onto the slabs from the feed nozzles, it will cause a mild tempering of the stronger solutions as they mix, and this is not so detrimental to the germ life.

The pores in the cast slab naturally clog under heavy loads, and as the face of the slab is pitched, any overload overflows from one slab onto the next, the anaerobic bacterium working in the pores to clear and further normal filtering action, while the aerobic bacterium is active in the sewage retained in the grooves in the face of the slab.

It will be further evident that this design provides for free circulation of air and also causes the liquid to travel the greatest possible distance in contact with the air, as the air is in contact with the liquid on the pitched face of the slab, and also when it drips from one slab to the next.

Due to the method of interlocking and placement, the direction of flow is reversed so that it follows a zigzag path or course. For example: A filter six feet in height with slabs three inches thick, making four to the foot, would cause the liquid traveling from top to bottom of a six-foot filter, with slabs one foot wide, to flow a distance of twenty-four linear feet, plus the six-foot drop.

I also wish to direct particular attention to the manner of mounting, these slabs being placed in superimposed relation, every second slab being reversed end for end, and being set in a distance sufficient so that the liquid from the low edge of the upper slab drips onto the high edge of the next slab (see Fig. 6), so that the direction of flow is reversed, the fillets 12 directing the flow at the ends so that there is no spillage. These slabs are also mounted so that one end of one slab is set in from the end of the lower slab on which it rests to form a ledge "A" on which an adjacent slab is placed, the opposite end overhanging said lower slab to form an interlocking end to end placement.

This construction provides for an equal distribution of weight of the sewage because when one slab is overloaded, it overflows onto the next slab. The filter never sloughs off fungi or slime in the raw state, due to the width of the slots and free opening, and material leaving the filter will be found to be a very fine inert substance.

In practice the sewage may be treated in any manner prior to running it through the filtering apparatus, feed pipes 13 being positioned over the rows of slabs, and nozzles 14 are provided so that the residual liquids may be sprayed over the slabs for the filtering operation. Each tier of slabs carries its own load, and perfect distribution can be accomplished as the stream of liquid, under high head, strikes the extreme edge of the slabs which it feeds, thence receding to the opposite end as the head lowers. The apparatus can be easily cleaned, as it is only necessary to flush with water in sufficient volume to carry away the liquid remaining on the slabs.

From the foregoing description it will be obvious that I have perfected a very simple, practical, and economical sewage filter, which provides a home for both anaerobic and aerobic germ life.

What I claim is:

1. A filtering apparatus for treating sewage, and comprising a precast porous slab having a plurality of closely spaced depressed surfaces of progressively varying heighth in the face thereof, said surfaces being of sufficient depth to retain a body of liquid therein, and being disposed transversely to the direction of flow of the sewage.

2. A filtering apparatus of the class described, and comprising a precast cement slab having a downwardly pitched face, and a plurality of closely spaced depressed surfaces of progressively varying depth formed in said face, each surface being of sufficient depth to retain a body of liquid therein.

3. A filtering apparatus of the class described, and comprising a precast porous slab having raised end walls and a plurality of closely spaced grooves of progressively varying depth provided in the face thereof, said grooves being of sufficient depth to retain a body of liquid therein.

4. A filtering apparatus for treating sewage, and comprising a precast porous slab having a downwardly pitched face, and closely spaced ribs of progressively varying height formed on said face, said ribs being disposed transversely to the direction of flow of the sewage.

5. A filtering apparatus for treating sewage, and comprising a precast porous cement slab having raised end walls, and a pitched face surface, and longitudinally disposed sharply defined ribs formed on said face in spaced apart relation.

6. A filtering apparatus for treating sewage, and comprising a porous cement slab having raised end walls and a downwardly pitched face, and longitudinally disposed ribs of progressively varying heights formed on said face in spaced apart relation, the ends of the lowest rib being formed with rounded raised fillets.

7. A filtering apparatus for treating sewage, comprising a porous cement slab having a downwardly pitched face, and longitudinally disposed ribs of progressively varying heights formed on said face in spaced apart relation.

WADE H. FOSTER.